Figure 3:
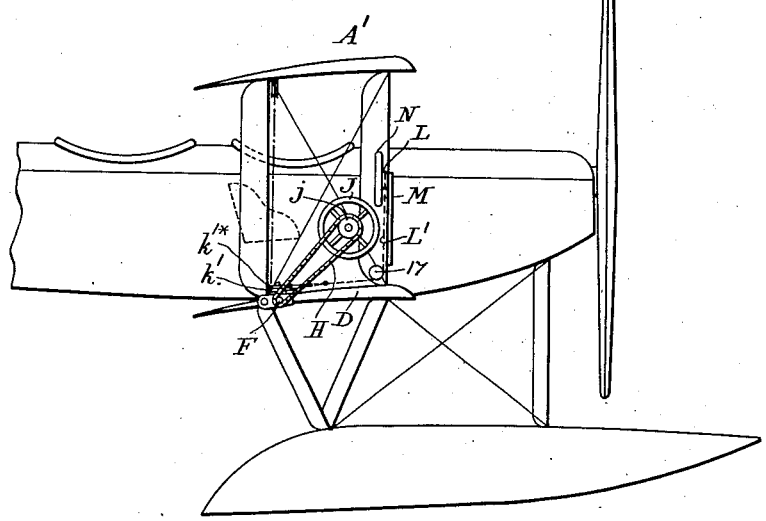

C. R. FAIREY.
CONTROLLING DEVICE FOR AEROPLANES.
APPLICATION FILED APR. 23, 1919.
1,359,345.
Patented Nov. 16, 1920.
5 SHEETS—SHEET 1.
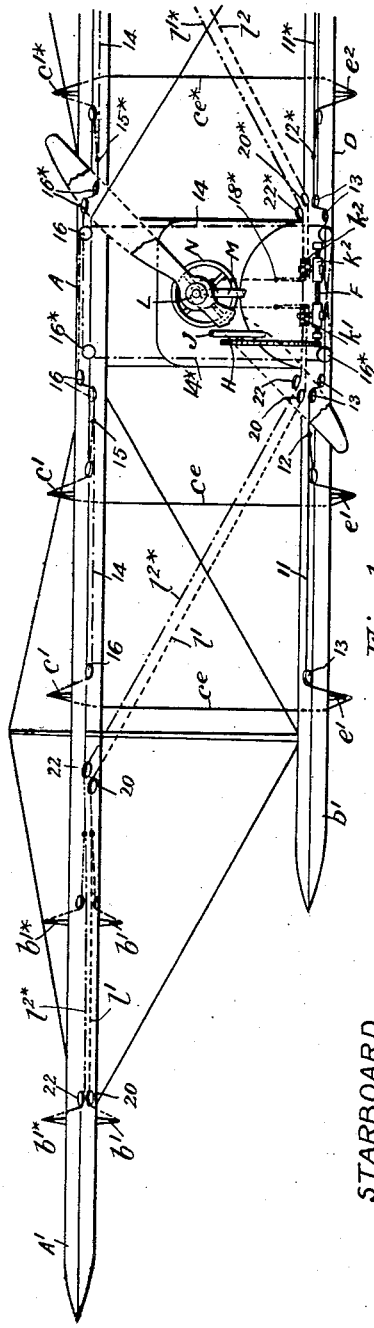
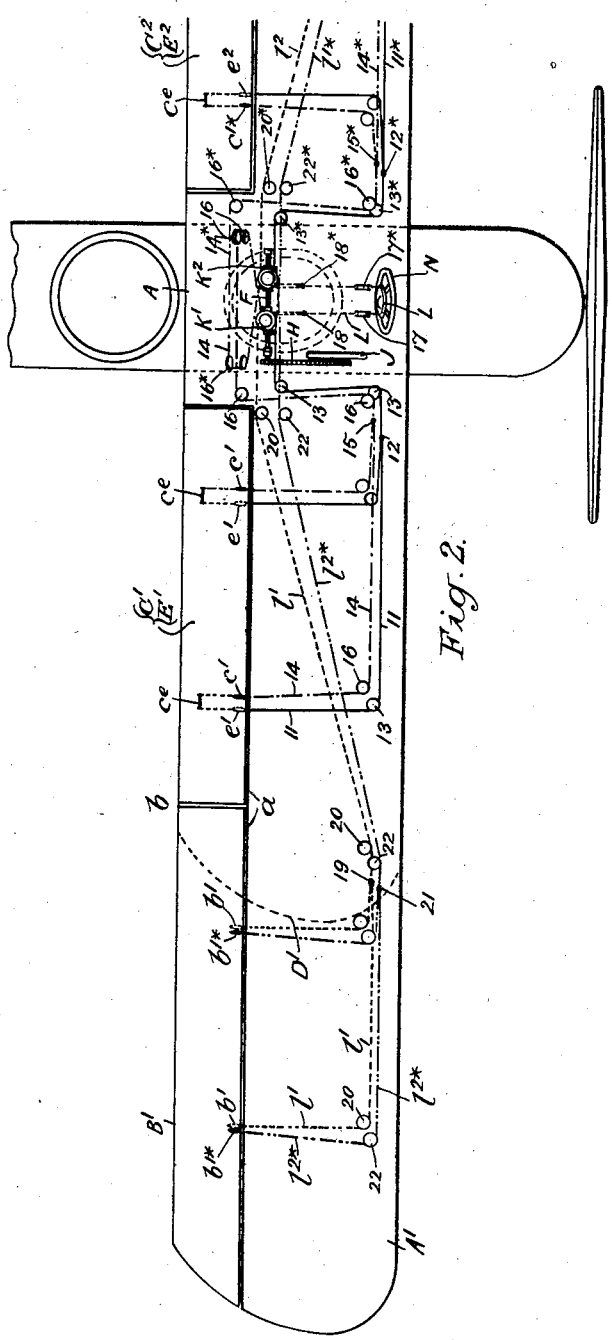

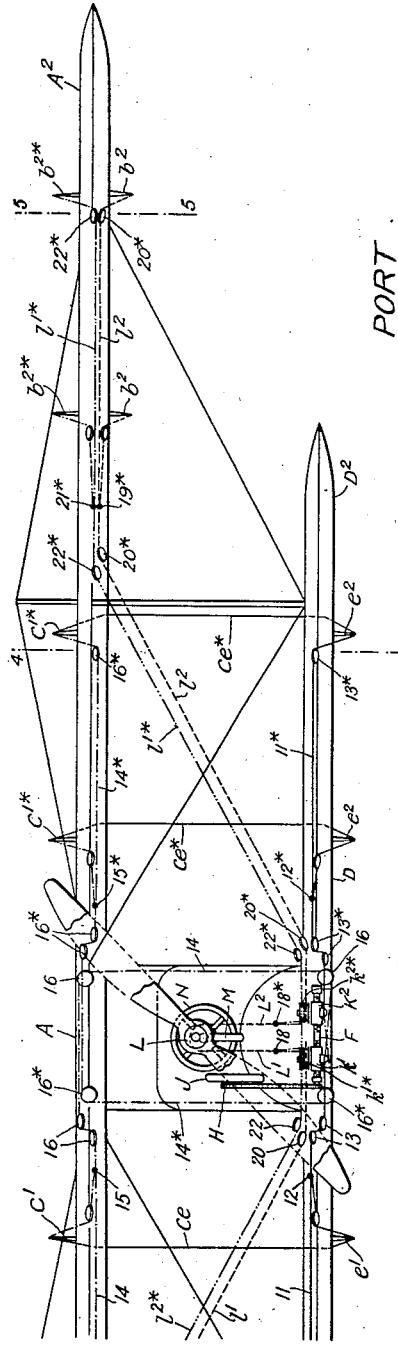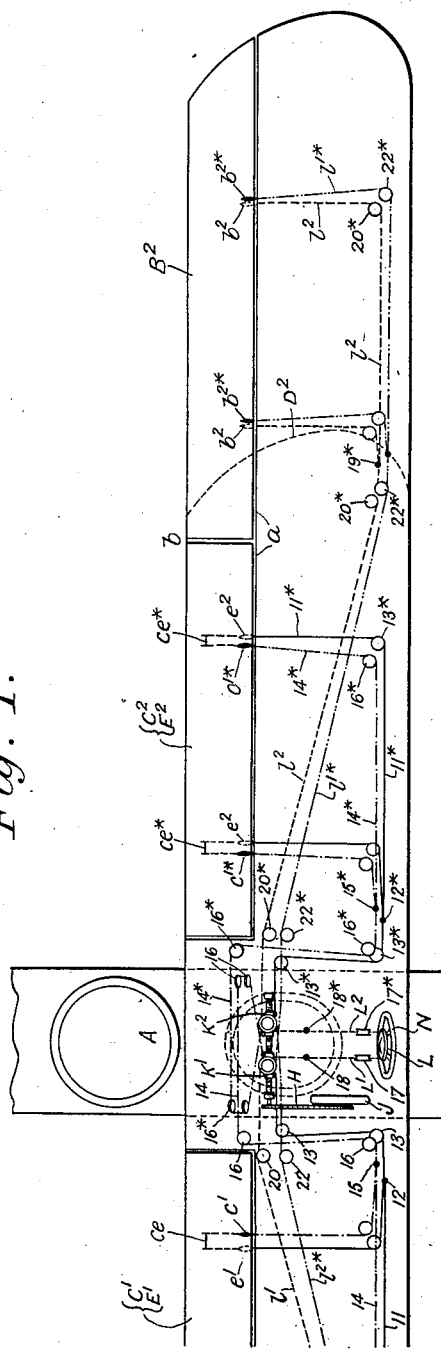

C. R. FAIREY.
CONTROLLING DEVICE FOR AEROPLANES.
APPLICATION FILED APR. 23, 1919.

1,359,345.

Patented Nov. 16, 1920.
5 SHEETS—SHEET 3.

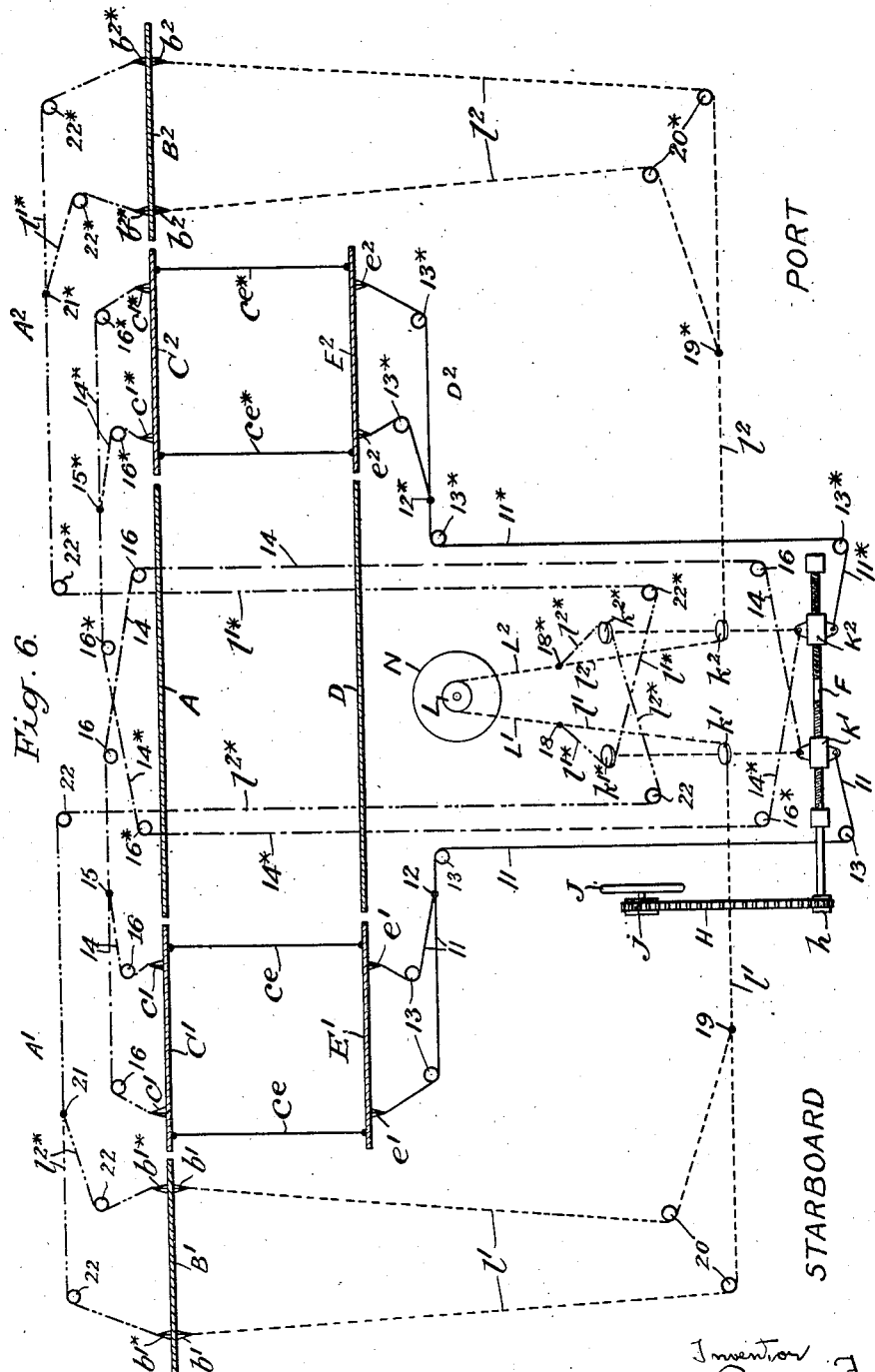

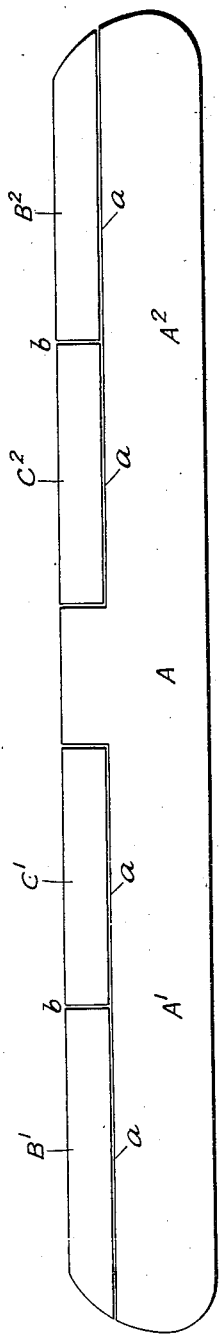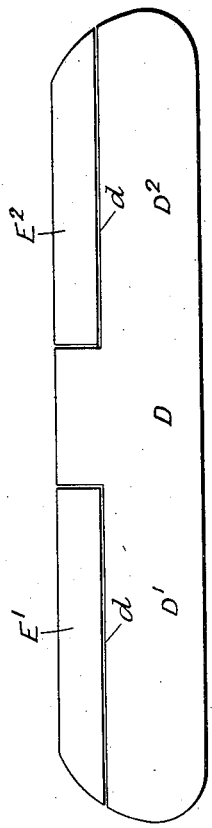

UNITED STATES PATENT OFFICE.

CHARLES RICHARD FAIREY, OF HAYES, ENGLAND.

CONTROLLING DEVICE FOR AEROPLANES.

1,359,345.   Specification of Letters Patent.   Patented Nov. 16, 1920.

Application filed April 23, 1919. Serial No. 292,165.

*To all whom it may concern:*

Be it known that I, CHARLES RICHARD FAIREY, a subject of the King of Great Britain, and formerly resident of Clayton Road, Hayes, in the county of Middlesex, but now of Cranford Lane, Hayes, in the county of Middlesex, England, have invented a certain new and useful Improvement in or Relating to Controlling Devices for Aeroplanes, of which the following is a specification.

This invention relates to aeroplanes and one object of the invention is to provide improved means whereby the camber of both wings can be varied simultaneously in the same direction, in such manner that the fore and aft sections of said wings can be changed at will so that the lifting power and efficiency of the machine as a whole can be varied with consequent modification of its speed capacity, without interfering with the capability of varying the cambers of the respective wings simultaneously in reverse directions, at will, to control lateral stabilization as usual.

For this purpose the whole of the trailing marginal portion of each plane of the wings may be hinged after the manner of an aileron or made flexible, with the result, in the latter case, that the different wing sections obtained are more uniform. The angle through which the wing is varied need not be uniform throughout the whole length of the wing.

Each of such trailing marginal portions when hinged forms preferably about one-fourth to one-third of the total chord of the plane, so that any change in the inclination (relatively to the rest of the wing) of such marginal portions or parts thereof will produce an effect equivalent to an alteration in both the camber and the angle of incidence either of the plane as a whole, or of the respective wings. The variation of the camber may be controlled by control cables which extend from opposite sides of a rotatable drum, around guide pulleys in such manner that an increase or a decrease in the distance separating the center of the drum from the center of the guide pulleys, or in the distance separating the centers of certain of the guide pulleys, will result in both control cables being drawn upon or relaxed, while rotation of the drum will cause the one control cable to be drawn upon and the other to be relaxed, or vice versa. The present invention enables such means to be employed in combination with what is known as "balance wire" mechanism serving to complete the mechanical circuit between the trailing marginal portions of the respective wings in such manner that when the trailing marginal portion of either wing is pulled down by its control cable, the trailing marginal portion of the other wing is pulled up by the balance wire; for which purpose, according to the invention, not only the control cables but also the balance wires appertaining to the trailing marginal portions of the respective wings are led around guide pulleys which are movable so as to relax or draw upon the balance wires according as the control cables are drawn upon or relaxed, the balance wires performing their usual function when the cambers of the respective wings are varied simultaneously in reverse directions.

For convenience of description the term "control cables" is employed to designate the wires which operate to increase the camber of the wings acting against the air pressure and the term "balance wires" is employed to designate the wires which operate in opposition to the control cables to afford positive control and which are pulled to decrease the camber of the wings. The combination of wires thus acting in opposition to each other to positively control the camber of the wings, constitutes what, for convenience of description, may be termed "a closed mechanical circuit."

In the embodiment of the invention illustrated, in the accompanying drawings the control cables leading from the trailing marginal portions of the respective wings to the control lever, pillar, or the like, serving to effect or permit the variation of the cambers of the respective wings simultaneously in reverse directions, are respectively passed around a pair of pulleys or other guides, the distance between which is adapted to be varied by screw action, whereby the effective lengths of both cables will be simultaneously increased or diminished with the result that the cambers of the respective wings will be varied simultaneously in the same direction.

In one form of this invention the control cables, which are connected with trailing marginal portions of the respective wings in the usual manner, are led around a pair of stationary guide pulleys and thence around a pair of movable guide pulleys rotatably mounted on a pair of nuts adapted to be moved transversely of the machine toward and away from one another by a right and left handed screw in threaded engagement with said nuts. The right and left handed screw is adapted to be rotated by a hand wheel situated in convenient proximity to the pilot's seat and revoluble in a vertical plane in the fore-and-aft direction. After passing around said movable guide pulleys the respective control cables are led in opposite directions around a manually-rotatable drum revoluble upon the control pillar in a transverse vertical plane.

By revolving the drum on the control pillar, the cambers of the respective wings are simultaneously varied in reverse directions to control lateral stabilization in the usual manner. When, however, the right and left handed screw is revolved, the nuts thereon will be caused to approach or recede from one another and the distance separating the centers of the movable guide pulleys will be decreased or increased, so that both cables will be equally drawn upon or equally relaxed, with the result that the cambers of the respective wings will be varied simultaneously in the same direction, and the desired wing section obtained.

The nature and object of the invention will more fully appear in the following specification read in connection with the accompanying drawing forming part hereof.

The invention will be described with reference to the accompanying drawings, which illustrate it diagrammatically as applied to a sea-biplane wherein the wings of the upper plane are extended laterally beyond those of the lower plane, and wherein the trailing marginal portion of each wing of the upper plane is divided into two parts (outer and inner); the inclinations of those parts which are adjacent to the tips of the respective wings of said plane being variable simultaneously either in the same direction or in reverse directions, at will, and the inclinations of those parts which are remote from the tips being variable simultaneously in the same direction and concurrently with the similar variation in the inclination of those parts which are adjacent to the tips, as set forth in the specification accompanying our application for U. S. Letters Patent Serial No. 292,167, filed April 23, 1919; while the trailing marginal portion of each wing of the lower plane is undivided and the inclinations of said portion of both wings are variable simultaneously in the same direction only, and concurrently with the similar variation in the inclinations of the trailing marginal portions of the upper plane. The example illustrated exhibits the present invention as applied in conjunction with an arrangement of control cables for the trailing marginal portions of the wings, and mechanism for actuating the same, such that the simultaneous variation in the cambers of the respective wings, whether in reverse directions or in the same direction, is effected by positive action transmitted through a closed mechanical circuit in accordance with the improved construction set forth in the specification accompanying our application for U. S. Letters Patent Serial No. 292,168, filed April 23, 1919.

Figure 5:
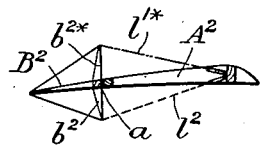
Figure 4:
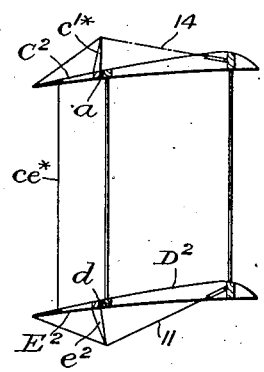

In the drawings, all of which are diagrammatic, Figure 1 is a front elevation of a part of the machine and Fig. 1ª is an elevation of the rest of the machine, Fig. 2 is a part plan view of a part of the machine and Fig. 2ª is a similar view of the rest of the machine, and Fig. 3 is a part side elevation of the machine. Fig. 4 is a vertical fore-and-aft section through both planes of one wing of the machine, and Fig. 5 is a similar section through one of the wing extensions of the upper plane and its aileron. Fig. 6 is a more elementary diagram showing, in front elevation, a dissected view of the various controls, which, in all those views wherein they appear, are respectively distinguished by full lines, plain dotted lines, single-dot and dash lines, and double-dot and dash lines. Figs. 7 and 8 are elementary plan views showing, respectively, the upper and lower planes of the machine with the flaps and ailerons.

In the example illustrated, each wing $A^1$ and $A^2$ of the upper plane A of the machine has the entire length of its trailing marginal portion hinged at $a$ to the rigid main portion of the wing, and each such hinged portion is divided, at a point $b$ near the center of its length, into two parts whereof that part $B^1$ or $B^2$ which is toward the outer end of the wing constitutes an aileron (properly so called) for use in controlling the lateral stability of the machine as well as in varying the camber of the wing as a whole, whereas that part $C^1$ or $C^2$ which is toward the center of the machine constitutes what will, for the sake of distinction, be hereinafter termed a "flap," employed solely (in conjunction with the corresponding aileron) in varying the camber of the wing as a whole. The lower plane D of the machine has no ailerons properly so called; that is to say each wing $D^1$ and $D^2$ of this lower plane extends, transversely of the machine, only a short distance beyond the outer extremity of the flap $C^1$ or $C^2$ of the upper plane, and has practically the entire length of its trailing marginal portion $E^1$ or $E^2$ hinged at $d$ to the rigid main portion of the wing, each such flap being employed solely (in conjunction with the flap and aileron of the corresponding upper wing) in varying the camber of the wing as a whole.

A horizontal transverse screw-shaft F, mounted to rotate in bearings beneath the pilot's seat G and having right-hand and left-hand threads upon the starboard and port halves of its length, is geared by means of a sprocket-chain H passing around a pulley $h$ on the shaft and a wheel $j$ turning as one with a hand wheel J which is mounted to rotate in a vertical longitudinal plane in convenient proximity to the seat G; nuts $K^1$, $K^2$ being fitted to work upon the starboard and port halves of the screw-shaft F so that, according as the hand wheel J is turned in the one or the other direction, the nuts $K^1$, $K^2$ will approach toward or recede from one another.

From a lug on the starboard nut $K^1$, a cable 11 (which is divided into two branches at a point 12 in its length) is led first in the starboard direction, and thereafter around a series of stationary guide-pulleys 13 to each one of a pair of levers $e^1$ fixed to the lower starboard flap $E^1$ near its hinge $d$ and extending downward therefrom; and from another lug on the same nut $K^1$, a cable 14 (which is divided into two branches at a point 15 in its length) is led first in the port direction, and thereafter around a series of stationary guide-pulleys 16 to each one of a pair of levers $c^1$ fixed to the upper starboard flap $C^1$ near its hinge $a$ and extending upward therefrom; while a pair of cables or struts $ce$, $ce$ connect the flaps $C^1$ and $E^1$ together near their rear or trailing edges so as to complete the mechanical circuit between them and insure both of said flaps being actuated positively whether the movement imparted to them by rotation of the hand wheel J be downward or upward.

Similarly, from a lug on the port nut $K^2$, a cable $11^*$ (which is divided into two branches at a point $12^*$ in its length) is led first in the port direction, and thereafter around a series of stationary guide-pulleys $13^*$ to each one of a pair of levers $e^2$ fixed to the lower port flap $E^2$ near its hinge $d$ and extending downward therefrom; and from another lug on the same nut $K^2$, a cable $14^*$ (which is divided into two branches at a point $15^*$ in its length) is led first in the starboard direction, and thereafter around a series of stationary guide-pulleys $16^*$ to each one of a pair of levers $c^{1*}$ fixed to the upper port flap $C^2$ near its hinge $a$ and extending upward therefrom; while a pair of cables or struts $ce^*$, $ce^*$ connect the flaps $C^2$ and $E^2$ together near their rear or trailing edges so as to complete the mechanical circuit between them and insure both of said flaps being actuated positively whether the movement imparted to them by rotation of the hand wheel J be downward or upward.

Hence it will be seen that if, on the one hand, the hand wheel J be turned so as to cause the nuts $K^1$, $K^2$ to approach one another, the cables 11 and $11^*$ will both be drawn upon with the result that the flaps $C^1$, $E^1$ and $C^2$, $E^2$ will all be depressed simultaneously; the cables 14 and $14^*$ being at the same time both relaxed so as to permit this downward movement of the flaps. If, on the other hand, the hand wheel J be turned so as to cause the nuts $K^1$, $K^2$ to recede from one another, the cables 14 and $14^*$ will both be drawn upon with the result that the flaps $C^1$, $E^1$ and $C^2$, $E^2$ will all be raised simultaneously; the cables 11 and $11^*$ being at the same time both relaxed so as to permit this upward movement of the flaps.

For the purpose of controlling the ailerons $B^1$, $B^2$, a drum L is mounted to revolve in a vertical transverse plane at the upper end of the usual control-pillar M, this drum turning as one with a hand wheel N; while on a stud projecting vertically from the starboard nut $K^1$ a pair of guide-pulleys $k^1$, $k^{1*}$ are mounted to turn independently, one above the other, and on a stud projecting vertically from the port nut $K^2$ a similar pair of guide-pulleys $k^2$, $k^{2*}$ are mounted to turn independently, one above the other. Over the drum L, two cables (which actually or virtually are portions of a single cable) $L^1$, $L^2$ are wound from opposite directions; the cable $L^1$, which is led from the starboard side of the drum downward and around a stationary guide-pulley 17 (Figs. 2 and 3) near the foot of the control-pillar M and thence rearward, being divided at a point 18 into two branches $l^1$ and $l^{1*}$; while the cable $L^2$, which is led from the port side of the drum downward and around a similar stationary guide-pulley $17^*$, is divided at a point $18^*$ into two branches $l^2$ and $l^{2*}$. On the one hand the branch $l^1$ (which is subdivided at a point 19 in its length) is passed around the lower pulley $k^1$ on the starboard nut $K^1$ and thereafter is led in a general starboardwise direction and around a series of stationary guide-pulleys 20 to each one of a pair of levers $b^1$ fixed to the starboard aileron $B^1$ near its hinge $a$ and extending downward therefrom; whereas the branch $l^{1*}$ (which is subdivided at a point $21^*$ in its length) is passed around the upper pulley $k^{1*}$ on the starboard nut $K^1$ oppositely to the direction of the branch $l^1$ around the pulley $k^1$, and thereafter is led in a general port-wise direction and around a series of stationary guide-pulleys $22^*$ to each one of a pair of levers $b^{2*}$ fixed to the port aileron $B^2$ near its hinge $a$ and extending upward therefrom. On the other hand the branch $l^2$ (which is subdivided at a point $19^*$ in its length) is passed around the lower pulley $k^2$ on the port nut $K^2$ and thereafter is led in a general port-wise direction and around a series of stationary guide-pulleys $20^*$ to each one of a pair of levers $b^2$ fixed to the port aileron $B^2$ near its hinge $a$ and extending downward therefrom; whereas the branch $l^{2*}$ (which is subdivided at a point 21 in its length) is passed around the upper pulley $k^{2*}$ on the port nut $K^2$ oppositely to the direction of the branch $l^2$ around the pulley $k^2$, and thereafter is led in a general starboard-wise direction and around a series of stationary guide-pulleys 22 to each one of a pair of levers $b^{1*}$ fixed to the starboard aileron $B^1$ near its hinge $a$ and extending upward therefrom.

It will thus be seen that the mechanical circuit is complete, between the starboard and port ailerons $B^1$ and $B^2$, as regards simultaneous movement of the respective ailerons in reverse directions; the one side of the circuit, comprising the branch cable $l^1$, cable $L^1$, cable $L^2$, and branch cable $l^2$, constituting the control cable for depressing either of the ailerons $B^1$ or $B^2$ alternatively, while the other side of the circuit, comprising the branch cable $l^{2*}$, cable $L^2$, cable $L^1$, and branch $l^{1*}$, constitutes the balance wire for raising either of the ailerons $B^1$ or $B^2$ alternatively; and it will be observed that both the cables $L^1$ and $L^2$ (which, as already stated, are actually or virtually portions of a single cable wound upon the drum L) form portions not only of the control cable but also of the balance wire as just defined.

That is to say, if, on the one hand, the hand wheel N be turned so as, by rotating the drum L in the same direction, to draw upon the cable $L^1$ and relax the cable $L^2$, the resulting pull on the cable $L^1$ will be transmitted through its branch $l^1$ so as to depress the starboard aileron $B^1$ and also through the branch $l^{1*}$ so as to raise the port aileron $B^2$, the concurrent relaxation of the cable $L^2$ with its branches $l^2$ and $l^{2*}$ permitting respectively the depression of the aileron $B^1$ and the raising of the aileron $B^2$; whereas, on the other hand, if the hand wheel N be turned so as, by rotating the drum L in the opposite direction, to draw upon the cable $L^2$ and relax the cable $L^1$, the pull on the cable $L^2$ will be transmitted through its branch $l^2$ so as to depress the port aileron $B^2$ and also through the branch $l^{2*}$ so as to raise the starboard aileron $B^1$, the concurrent relaxation of the cable $L^1$ with its branches $l^1$ and $l^{1*}$ permitting respectively the depression of the aileron $B^2$ and the raising of the aileron $B^1$.

It will also be seen that the efficiency of the mechanical circuit is maintained, as between the starboard and port ailerons $B^1$ and $B^2$, during simultaneous movement of the respective ailerons in the same direction concurrently with the corresponding movement of the flaps $C^1$, $E^1$ and $C^2$, $E^2$. For, although actuation of the ailerons $B^1$, $B^2$ by means of the hand wheel N and drum L as just described will not affect any of the flaps $C^1$, $E^1$ and $C^2$, $E^2$ for the reason that rotation of the hand wheel N does not cause variation in the distance between the nuts $K^1$, $K^2$; nevertheless rotation of the screw-shaft F by means of the hand wheel J will not only actuate the flaps $C^1$, $E^1$ and $C^2$, $E^2$ as previously described, but will also cause both ailerons $B^1$ and $B^2$ to be depressed or raised simultaneously according as the flaps are depressed or raised. The reason for this is that if, on the one hand, the hand wheel J be turned so as, by rotating the screw-shaft F, to cause the nuts $K^1$, $K^2$ to approach one another, and, by thus drawing upon the cables 11 and 11*, to depress all the flaps simultaneously, the result will be that the concurrent approach to one another of the pulleys $k^1$, $k^{1*}$ and $k^2$, $k^{2*}$ will have for effect not only to draw upon the cables $l^1$ and $l^2$ so as to depress both the ailerons $B^1$ and $B^2$, but also to relax the cables $l^{1*}$ and $l^{2*}$ so as to permit such depression to take place. The pulleys $k^1$ and $k^{2*}$ may be described as a pair, one of which engages the control cable $l^1$ and the other of which engages the corresponding balance wire $l^{2*}$ and the movement of the two pulleys of the pair may be described as complementary, one serving when moved to tighten or relax the control cable and the other serving to simultaneously and complementarily relax or tighten the balance wire to substantially the same extent, thus maintaining the desired positive control. Similarly, the pulleys $k^2$ and $k^{1*}$ constitute a second pair. If, on the other hand, the hand wheel J be turned in the opposite direction so as to cause the nuts $K^1$, $K^2$ to recede from one another, and, by thus drawing upon the cables 14 and 14*, to raise all the flaps simultaneously, the result will be that the concurrent recession from one another of the pulleys $k^1$, $k^{1*}$ and $k^2$, $k^{2*}$ will have for effect not only to draw upon the cables $l^{1*}$ and $l^{2*}$ so as to raise both the ailerons $B^1$ and $B^2$, but also to relax the cables $l^1$ and $l^2$ so as to permit such raising to take place.

It will be obvious that in all cases the arrangement should be such that the extent to which any control cable is drawn upon or relaxed should be as nearly as possible exactly equal to the extent to which the coacting but opposed cable (which completes, or assists in completing, the mechanical circuit between the parts controlled by said cables) is relaxed or drawn upon.

The hinges for the trailing marginal portions of the wings are such that greater angular movement of said portions relatively to the rest of the wings will be permitted than can be produced by variation in the distance between the centers of the movable guide pulleys $k^1$ and $k^2$, or $k^{1*}$ and $k^{2*}$, with the result that to whatever extent said portions of both wings may have been moved simultaneously in the same direction, they will still be capable of movement simultaneously in reverse directions under the control of the hand wheel N and drum L.

If the right and left handed screw F be threaded to a low pitch a very fine adjustment of the cambers of the wings simultaneously in the same direction can be obtained, and, further, the necessity of providing extraneous means for locking the parts in position is obviated. It is to be observed that by means of the movable guide pulleys $k^1$, $k^2$, and $k^{1*}$, $k^{2*}$, both cables $l^1$, $l^2$ and $l^{1*}$, $l^{2*}$ are strained to the same extent, so that unequal lateral strains on the control pillar M are avoided.

I claim:—

1. In an aeroplane, the combination with a wing structure comprising a pair of ailerons, of a cable, one end of which is connected to one of said ailerons, a second cable, one end of which is connected to the other of said ailerons, a control member with which the other ends of said two cables are connected in such manner that one of said cables may thereby be pulled and the other simultaneously relaxed, and two bodily movable guides both positioned at one side of said control member and each movably engaging one of the cables at a point intermediate its ends, and means to move said guides simultaneously so as simultaneously to pull or to relax said cables, substantially as and for the purpose described.

2. In an aeroplane, the combination with a winged structure comprising a pair of ailerons, of a cable, one end of which is connected to one of said ailerons, a second cable, one end of which is connected to the other of said ailerons, a control member with which the other ends of said two cables are connected in such manner that one of said cables may thereby be pulled and the other simultaneously relaxed, and two movable guides each engaging one of the cables at a point intermediate its ends, and means to move said guides simultaneously toward and away from each other so as simultaneously to pull or to relax said cables, substantially as and for the purpose described.

3. A structure as specified in claim 2, in which the means for moving the guides comprise a rotatable screw having right and left hand threaded portions, a pair of nuts in threaded engagement with said right and left hand threaded portions respectively, and connections between said nuts and said guides respectively.

4. In an aeroplane, the combination with a wing structure comprising a pair of ailerons, of a cable, one end of which is connected to one of said ailerons, a second cable, one end of which is connected to the other of said ailerons, a control member with which the other ends of said two cables are connected in such manner that one of said cables may be pulled and the other simultaneously relaxed; flexible connections between each of said cables and that side of the aileron which is opposite to that to which the other cable is connected, two movable guides, each engaging one of the cables, and two movable guides, each engaging one of said flexible connections, together with means to move said guides simultaneously so as simultaneously to pull or relax said cables and flexible connections, substantially as and for the purpose described.

5. A structure as specified in claim 4, in which the means for moving the guides comprise a rotatable screw—having right and left hand threaded portions—a pair of nuts thereon, and a connection between each of said nuts and the guide connected with one of said cables and the guide connected with the flexible connection attached to such cable, substantially as and for the purpose described.

6. In an aeroplane, the combination with a wing structure, having trailing marginal portions of variable inclination, the inner parts thereof constituting camber varying flaps, and the outer parts thereof adjacent the tips being capable of movement independently of the inner parts and constituting camber varying ailerons, of a cable, one end of which is connected to one of said ailerons, a second cable, one end of which is connected to the other of said ailerons, a control member with which the other ends of said two cables are connected in such manner that one of said cables may be pulled and simultaneously the other cable may be relaxed to increase the camber of the outer part of one wing and decrease the camber of the outer part of the other wing and two movable guides, each engaging one of the cables, and means to move said guides simultaneously so as simultaneously to pull or relax said cables to increase or decrease the camber of the outer parts of both wings, and cables connected to said flaps and said guides to cause the camber of the inner parts of both wings to be increased or decreased upon movement of the guides concurrently with the similar increase or decrease of the camber of the outer parts of both wings affected by such movement of the guides.

7. A structure as specified in claim 6 in which the means for moving guides are arranged to move said guides toward and away from each other.

8. A structure as specified in claim 7 in which the means for moving the guides comprises a rotatable screw having right or left hand threaded portions, a pair of nuts in threaded engagement with said right and left hand portions, respectively, and connections between said nuts and said guides respectively.

9. A structure as specified in claim 6 in combination with balance wires connected to said ailerons and flaps, and acting in opposition to the cables and connected to the cables, control member and guides in such manner that each balance wire is pulled or relaxed when the corresponding cable acting in opposition thereto is relaxed or pulled and to an equal extent.

10. In an airplane, an aerofoil, means for regulating the camber of said aerofoil, including a cable, a rod having oppositely threaded portions, nuts mounted upon said threaded portions, guide pulleys for said cable carried by said nuts, and a hand wheel connected to said rod for rotating the rod for moving said guide pulleys toward or away from each other to regulate the operative length of said cable.

11. In an airplane, an aerofoil, means for regulating the camber of the aerofoil for varying the speed range of the airplane including a cable, a rod having oppositely threaded portions, nuts mounted upon said threaded portions, guide pulleys for said cable carried by said nuts, said cable passing about said guide pulleys and leading from each of the guide pulleys in opposite directions for connection with the aerofoil for varying the camber of the aerofoil throughout its span upon rotation of said rod, a second rod, a drum carried by said second rod, a cable passing about said drum and connected to the aerofoil for varying the camber of the aerofoil on each side of the longitudinal center of the airplane so as to present to the atmosphere different aerofoil curvatures on each side of the central axis to maintain lateral stability of the airplane.

CHARLES RICHARD FAIREY.